United States Patent Office 2,747,630
Patented May 29, 1956

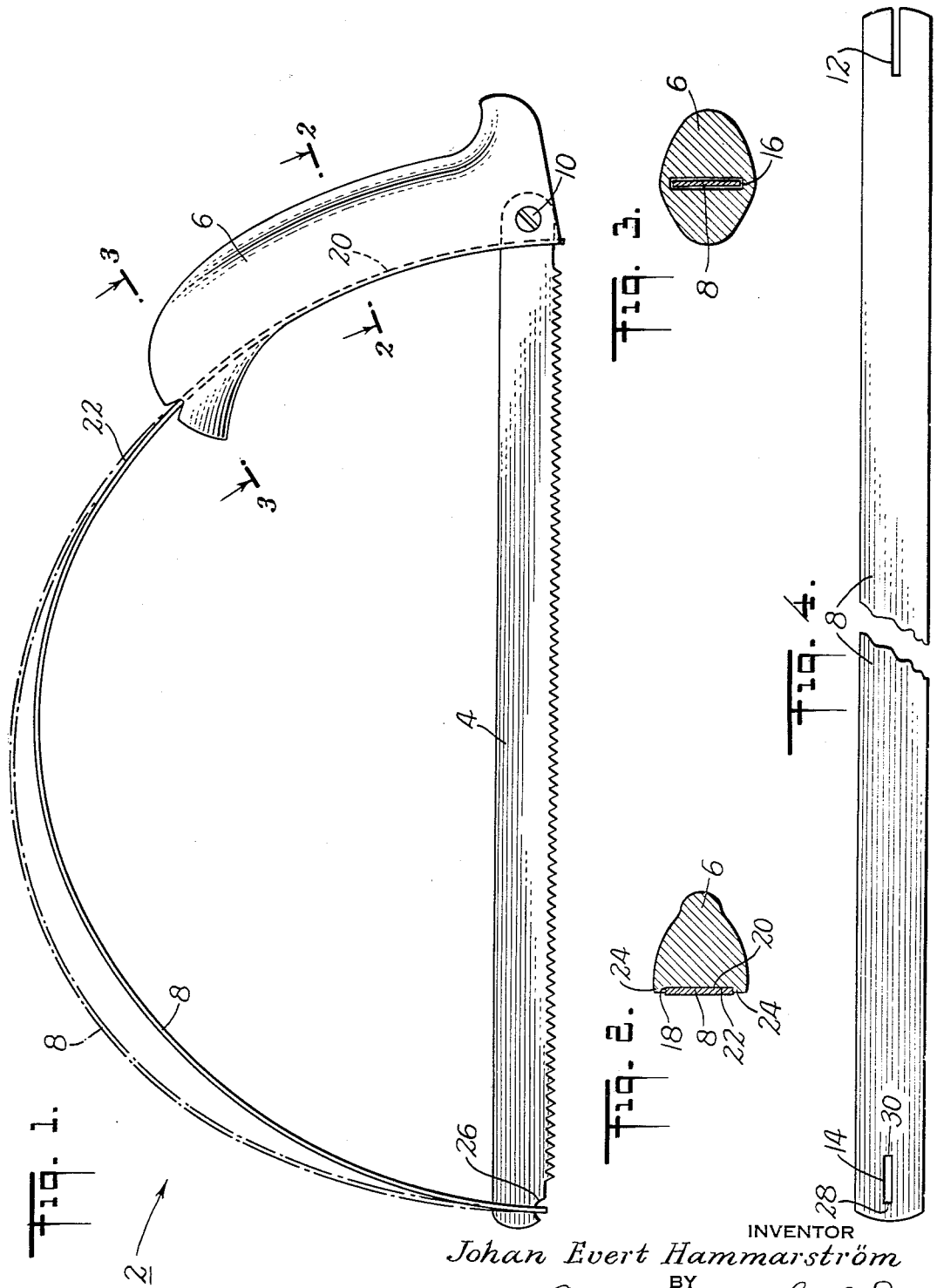

2,747,630

BOW SAW WITH SPRING METAL SAW BOW

Johan Evert Hammarström, Sandviken, Sweden, assignor to Sandvikens Jernverks Aktiebolag, Sandviken, Sweden, a corporation of Sweden Application March 12, 1953, Serial No. 341,893

Claims priority, application Sweden September 9, 1952

12 Claims. (Cl. 145—33)

This invention relates to improvements in bow saws, and more in particular to bow saws of small size, such as are used in the household for cutting bread and other foods, and for sawing wood and metal.

It is desirable that bow saws of the above character be sturdy and yet light weight, and that there be a minimum number of parts. Furthermore, such saws which are used for cutting food should be constructed so as to be readily disassembled for frequent cleaning; and it is desirable that the saw blade be easily changed. There has been some resistance to the adoption and use of bow saws of small size because of some lack of versatility, for example, the depth of cutting has been limited to the depth of the bow. Attempts to provide a bow saw which permits a deeper cut have not been satisfactory because the saw either is complicated and expensive to manufacture and difficult to manipulate, or it lacks the desired rigidity, lightness in weight and operating characteristics.

An object of the present invention is to provide a saw construction which is thoroughly practical in every respect and yet which overcomes the difficulties which have been referred to above with respect to prior bow saws. A further object is to provide a bow saw construction which is of minimum size and weight and has a minimum number of parts, and yet which is versatile in use. A further object is to provide a simplified construction of the above character where the height of the bow may be readily increased so as to permit a deeper cut than is normally possible. These and other objects will be in part obvious and in part pointed out below.

In accordance with the present invention a bow saw is provided which has three main components or parts; the saw blade, the bow, and the handle; and these components are so related to each other as to give a greatly improved and simplified construction. At the same time the saw meets the most exacting requirements with respect to simplicity and to ease of manufacture, and with respect to versatility of use. The illustrative embodiments of the present invention are household saws and the saw blades may be readily changed, for example, for sawing or cutting different materials, such as bread or meat or even wood or metal.

These saws have bows consisting of plate springs; i. e. flat, narrow strips of spring steel. One end of each bow has an elongated opening which receives and holds the end of the saw blade remote from the saw handle. The other end of the bow is slidably received in the saw handle and is bifurcated with an end slot into which the end of the saw blade is received, and this end of the saw blade is attached to the handle by a removable pin or screw bolt. When the saw is thus assembled, the bow has a special curve form which permits easy sliding of its end up and down along the handle surface. During such upward movement the bifurcated end of the bow may be drawn up away from the saw blade and yet there is substantially constant friction between the bow and the handle. The raising of this bifurcated end of the bow substantially increases the bow height so as to increase the depth of sawing which is possible.

Referring now to the drawings:

Figure 1 is a side elevation of a household wood saw constituting one embodiment of the invention;

Figures 2 and 3 are sectional views respectively on the lines 2—2 and 3—3 of Figure 1;

Figure 4 is a plan view on a reduced scale of the saw bow of Figure 1;

Figure 5:
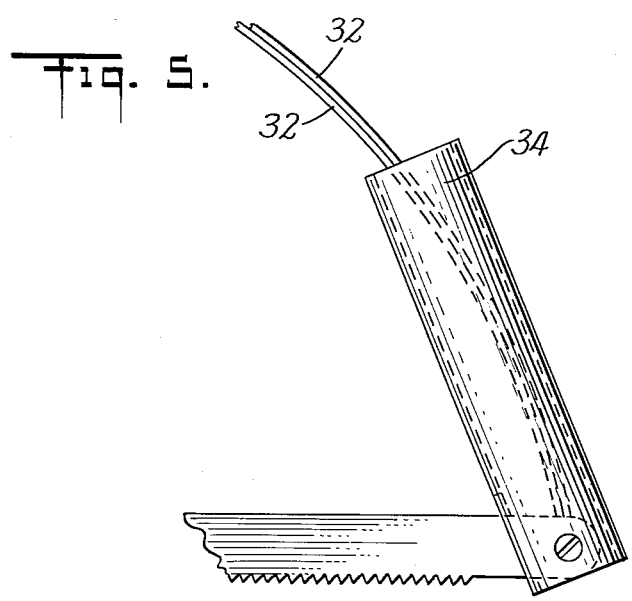
Figure 5 is a fragmentary view similar to the right-hand portion of Figure 1, but showing another embodiment of the invention.

Referring particularly to Figure 1 of the drawings, a household bow saw 2 has a saw blade 4, a handle 6 and a saw bow 8. The right-hand end of the saw blade extends into a slot in the handle and is attached to the handle by a screw 10. The saw bow 8 is a flat strip of spring steel (see Figure 4) with a slot 12 at its end adjacent the handle and with a rectangular opening 14 at the opposite end. The saw bow 8 is shown in Figure 4 in its flat or unbowed position, which position it assumes when disconnected from the saw blade and the handle. Handle 6 provides a bow-receiving pocket or recess, which at the top of the handle is in the form of a rectangular opening 16 (see Figure 3) and at the central and lower portion of the handle is in the form of a slideway or rectangular channel 18 formed by side flanges 24. The rectangular opening 16 and the channel 18 present a continuous curved surface 20, against which the top side or outside curved surface 22 of the saw bow rests.

This handle end of the saw bow therefore extends through the rectangular opening 16 and downwardly along the surface 20 in channel 18 between flanges 24. The lower slotted or bifurcated end of the spring bow is positioned with the saw blade in the slot 12, and with the extreme end of the saw bow extending below the bottom edge of the saw blade. Thus, the left-hand end of the saw bow is secured to the saw blade and the right-hand end of the saw bow is positioned in co-acting relationship with the saw handle and the handle end of the saw blade.

As indicated above, the handle surface 20, against which the saw bow rests has a particular curve form, i. e., that of an elastic line; and, the dimensions and characteristics of the parts are such that the handle end of the saw bow is held securely even though no positive fastening means is provided. Furthermore, the saw bow may be drawn partially out of the handle recess, for example, with the lower end above the saw blade and the saw bow assumes the broken-line position of Figure 1. The top of the handle is held against the saw body by the confining walls of opening 16, so that the curvature of the saw body does not change within the zone of the handle, but bulges out to the broken-line position between the handle and the end attached to the saw blade. The attachment between the saw body and the saw blade is by the simple means of the slot 14, but the bottom surface of end 28 of this slot rides freely along the arcuate surface 26. Thus, the saw body exerts forces to the left upon the end of the saw blade, and to the right upon the handle which tends to hold the saw blades straight. At the same time, the saw body may be flexed considerably with no tendency toward overstraining or binding of the parts.

When the saw bow is in this broken-line position it assumes the curve form of an elastic line of greater length and of a greater mean height above the sawing edge of the saw blade. Hence, the saw may be used for a deeper cut and with considerably greater freedom of action. The friction between the saw blade and the surface 20 of the handle retains the saw bow in the desired position with no substantial tendency for the saw bow to slide upwardly away from the handle or downwardly to the full line position of Figure 1.

The particular constructions and shapes and the relative proportions of the parts of the elements shown in the drawings insure that the objects above set forth are attained. The surface 20 of the handle is of predetermined shape to present a surface longitudinal of the saw bow which follows the curve form of a particular elastic line. That is, when the saw bow has its two ends placed as shown at the ends of the saw blade, there are stress forces produced in accordance with the following curve form:

$$\frac{d^2y}{dx^2} = \frac{-Fv}{E.I}$$

From this we get:

$$R = \frac{E.I}{F.v} \text{ (Approximate)}$$

In the above: $v$ is the height of the saw bow over the saw blade; $x$ is the length along the saw blade; $R$ is the radius of curvature; $F$ is the total force exerted by the saw bow; $E$ is the modulus of elasticity; and, $I$ is the moment of inertia.

The length of the saw bow 8 is $$\frac{\pi}{2}$$

times the length of the saw blade 4, and the saw bow is given a form by the saw handle which is approximately hyperbolic; the handle end of the saw bow is at an angle of 80° to the line of the lower edge of the saw blade. With this relationship the variation in the friction force between the saw bow and handle is less than 1% when the saw bow is moved in the saw handle between the two extreme positions, as referred to above. If the saw bow were of an appreciably different relative length the advantageous results would be materially interfered with. For example, a 10% reduction in the length of the saw bow would cause a reduction of 14% in the height of the bow, and this would reduce the cutting depth to an objectionable extent; and, the friction would vary substantially during the sliding of the saw bow upwardly within the handle.

If the length of the saw bow were increased from that here shown, the curvature would be increased, and the frictional forces would not be satisfactory. For example, if the saw bow were caused to intersect the saw blade at a tangent angle of 90° instead of at 80°, the friction effect with the saw handle would be too low to obtain the results desired. With the arrangement shown, the effective bow height may be increased as much as 30% and yet the friction does not vary objectionably throughout the range of adjustment.

The opening 16 in the handle and the side flanges 24 hold the saw bow in exact alignment, and as indicated above, it may be moved up and down without difficulty and will remain in any selected position. The saw may be disassembled by withdrawing the saw body from the saw handle, and then permitting the saw body to straighten out while restraining it to prevent a whipping action. The saw body is then swung counter-clockwise, with the end attached to the saw blade as a center, and the end of the saw blade is thus removed from slot 14. This simple connection between the saw body and the saw blade permits easy disassembling. However, when the saw is assembled, the slot 14 is not of sufficient length to allow the blade to rise and move out of the slot. After disassembling, the handle may be swung around into general alignment with the saw blade, and the saw body may then be placed at the side of the saw blade for easy packaging and storage. The saw blade may be removed and replaced by removing the screw 10. Assembly of the saw is accomplished by a reversal of the steps described above.

Under some circumstances, the saw bow may be in the form of a plurality of bow springs. Hence in the embodiment of Figure 5, two bow springs 32 are provided which are received in a slot opening in a somewhat cylindrical handle 34. The ends of bow springs 32 are not slotted, and they are shown resting upon the top of the saw blade 4. They may be moved upwardly from this position in accordance with the discussion above.

Figure 6:
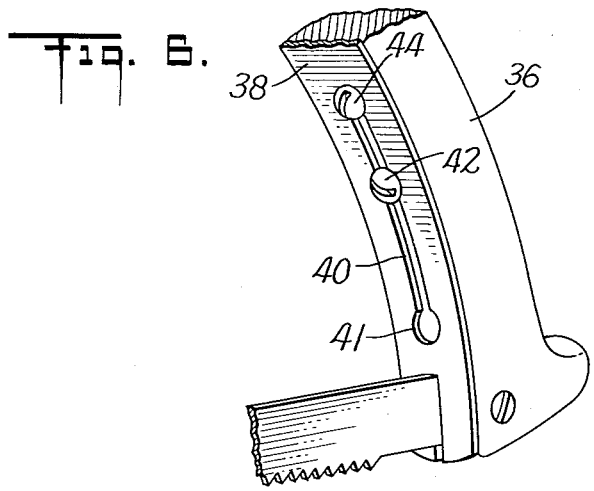
Figure 6 is a fragmentary perspective view of another embodiment of the invention; and, Figure 7 is a sectional view similar to Figure 2, but showing another embodiment of the invention.

In the embodiment of Figure 6, the handle 36 is not provided with flanges 24 as in Figure 1, but is held in operative relationship by a pair of screws 40 and 42. The saw bow 38 is provided with a central elongated slot 40 through which these screws extend into the handle. These two screws hold the saw bow in alignment as it moves upwardly in the manner discussed above, and screw 44 acts as a stop to limit the upward movement. At the top of slot 40 there is an enlargement or contiguous opening 41 through which the head of screw 42 may pass during assembly and disassembly.

Figure 7:
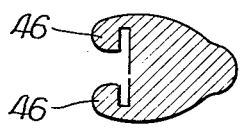

The embodiment of Figure 7 is similar to that of Figure 1 except that flanges 46 replace flanges 24 and extend to the top of the handle and overhang the saw bow and there is no opening 16. Thus, these flanges hold the top of the handle and the saw bow together and insure the operating relationship described above.

In the embodiments of Figures 5 and 7, the assembly and disassembly is substantially as with the embodiment of Figures 1 to 4. With the embodiment of Figure 6, the disassembly is accomplished by first removing screw 44, and then sliding the end of the saw body along the saw blade away from the saw handle until the head of screw 42 passes out of the enlarged opening 41 of slot 40. The additional steps of disassembly are as described above.

In each of the illustrative embodiments, the saw handles are all wood, which has desirable characteristics. Under some circumstances, the handles may be made of suitable plastics or metal.

I claim:

1. In a bow saw, the combination of, a saw bow comprising a flat strip of spring metal having an opening at one end by which it is connected to the end of a saw blade and having an open slot at its other end into which the other end of the saw blade is slideably received, a handle rockably connected to said other end of the saw blade and presenting a flat arcuate saw bow contacting surface against which said saw bow rests, said saw bow and said handle being interengaged whereby said saw bow exerts substantial force holding the outer surface of the saw bow into frictional engagement with said contacting surface, said saw bow and said contacting surface intersecting the line of the edge of said saw blade at an angle of the order of 80°, said slotted end of said saw bow being slidable along said contacting surface while maintaining a predetermined relationship.

2. A bow saw as described in claim 1, wherein the interengagement between the saw bow and the handle is formed by a slot in the handle with means overhanging the saw bow to hold the top of the handle in operative relationship with respect to the saw bow.

3. A bow saw as described in claim 1, wherein the slotted end of the saw bow intersects the saw blade at an angle between 62° and 85°, and wherein the saw bow between the top of the handle and said one end is in the form of an elastic line substantially hyperbolic.

4. A bow saw as described in claim 1, wherein said saw bow has an elongated opening adjacent its slotted end, and a pair of screws extending through such elongated opening into said handle to provide limited sliding movement.

5. In a bow saw of the character described, the combination of, a saw blade, a handle attached to one end of said blade, and a plurality of saw bows which are substantially identical and which lie adjacent each other, each of said saw bows being in the form of a deformed flat spring having one of its ends attached to the other end of said saw blade, each of said saw bows having its other end slidably received in said handle and having said other end movable to and from said saw blade along an arcuate path extending transversely of the longitudinal extent of said saw blade and at an angle thereto of between 62° and 85°, one of said saw bows having its said other end in frictional engagement with the mating surface of said handle.

6. A bow saw as described in claim 5, wherein said handle is in the form of a substantially cylindrical member having a substantially closed recess into which the ends of said saw bows project.

7. In a bow saw, the combination of, a saw bow comprising a flat spring metal construction having an opening in one end for the reception of a saw blade, a saw blade having a notch at one end and having said end extending through said opening in said saw bow with a portion of the saw bow positioned in said notch, a handle removably attached to the other end of said saw blade by pivot means extending transversely through the adjacent end of the saw blade and permitting rocking movement of the handle with respect to the saw blade, said handle having a surface which is substantially a segment of a cylinder one diameter of which extends substantially along said saw blade, said saw bow having its other end slidably positioned on said surface in frictional engagement therewith whereby said saw bow may have said other end slid to and from a position wherein it engages said saw blade at an angle of between 62° and 85° with respect to the edge thereof, said handle having integral means remote from said saw blade which interlocks with said saw bow and holds the adjacent portion thereof against said surface.

8. A bow saw as described in claim 7 wherein the end of said saw blade which is attached to said saw bow has an arcuate configuration, and wherein said handle has an opening remote from said saw blade through which said saw bow extends with a snug relationship.

9. A bow saw as described in claim 7 wherein said handle has flanges remote from said saw blade which cooperate with said surface to hold the edges of the saw body snugly.

10. A bow saw as described in claim 7 wherein said saw bow is in the form of a plurality of separate strips in side-by-side relationship.

11. A bow saw as described in claim 7 wherein said handle is a substantially cylindrical member having a longitudinal slot within which said saw bow is received.

12. In a bow saw, the combination of, a saw blade, a saw bow comprising a flat strip of spring metal which is connected at one end to said saw blade and which extends at its other end to the other end of said saw blade with the angle between said other end of said saw bow and the line of the cutting edge of the saw blade being of the order of 80°, and a handle rockably connected to said other end of said saw blade and presenting a flat arcuate saw bow contacting surface against which said other end of said saw bow rests with a substantial force being exerted between said saw bow and said contacting surface, said handle including holding means overlying said saw bow and holding said saw bow adjacent said handle at the end of the handle remote from said saw blade while permitting sliding movement of said saw bow along said contacting surface.

References Cited in the file of this patent
UNITED STATES PATENTS

| | | |
|---|---|---|
| 73,341 | Jones | Jan. 14, 1868 |
| 277,141 | Learned | May 8, 1883 |
| 288,791 | Girrens | Nov. 20, 1883 |
| 509,256 | Snell | Nov. 21, 1893 |
| 528,415 | Danielson | Oct. 30, 1894 |
| 595,315 | Ladd | Dec. 14, 1897 |
| 1,387,274 | Killian | Aug. 9, 1921 |